UNITED STATES PATENT OFFICE.

EDWARD HUBBARD RUSSELL, OF PARK CITY, UTAH TERRITORY.

PROCESS OF SEPARATING PRECIOUS METALS FROM ORES, &c.

SPECIFICATION forming part of Letters Patent No. 296,709, dated April 8, 1884.

Application filed May 28, 1881. (No specimens.)

*To all whom it may concern:*

Be it known that I, EDWARD H. RUSSELL, of Park City, in the county of Summit and Territory of Utah, have invented certain new and useful Improvements in Processes of Separating Silver and other Precious Metals from Ores, &c., of which the following is a specification.

My invention relates to an improvement in that method of extracting precious metals from ores and metallurgical products—such as matte and speiss—containing lead, known as "lixiviation" or "leaching," wherein a solution containing a hyposulphite of an alkali or alkaline earth is passed through the ore for the purpose of dissolving certain compounds of the metals and washing them therefrom.

The object of my invention is to secure the production of gold, silver, and copper free from lead.

To this end the invention consists in using a leaching solution containing in addition to the hyposulphite a soluble carbonate—such as sodium, potassium, or ammonium carbonate—which changes sulphate and chloride of lead, which would otherwise be dissolved by the hyposulphite solution, into carbonate of lead, which is insoluble in the hyposulphite solution, without, however, interfering with the usual dissolution of the chlorides of silver, gold, and copper.

In order that the nature and character of my invention may be more fully understood, I will first describe the usual leaching process, and afterward describe the manner in which my improvement is employed in connection therewith.

The usual means for leaching consists of, first, one or more tanks containing a solution of a hyposulphite in water; second, tanks or tubs for leaching the ore, the tanks being provided with false bottoms of canvas or matting, which act as filters; third, precipitating-tanks into which the solution or filtrate is conducted after it has dissolved the soluble compounds of the metals out of the ore.

In the process of leaching the ore, tanks are filled about two-thirds full of pulverized ore. Then, if the ore has been artificially chloridized, water is turned on the ore and allowed to filter through and run to waste, carrying with it certain compounds—such as sodium, sulphate, &c.—which are by-products of the chlorination process and are not worth saving. After these worthless compounds have been dissolved out of the ore, it is leached with the hyposulphite solution. This solution has the property of dissolving the chlorides of gold and silver, and also chloride of copper. Unfortunately, however, the solution also dissolves chloride and sulphate of lead, which is highly objectionable, as the presence of lead in the gold and silver bullion renders the refining of that bullion a very expensive operation. After passing through the ore, the solution containing the gold and silver, copper, and lead is conducted into the precipitating-tanks when a precipitating agent is added, this agent being usually a sulphide of an alkali or alkaline earth, which converts the compounds of gold, silver, copper, and lead into insoluble sulphides. These are allowed to settle to the bottom of a tank, and the solution is then drawn off and returned to the solution-tanks to be used again. The sulphides are collected, dried, and roasted to expel a portion of the sulphur. They are then heated in crucibles to remove the remainder of the sulphur, and in this way are reduced to the metallic state and then cast into bars. This bullion is usually of a low grade, on account of the lead which it contains. The fact that a low-grade bullion is usually produced by the leaching process constitutes one of the greatest objections to the use of this process, and it is the object of my invention to remove this objection. In order to do this, I make use, as before stated, of a solution containing a soluble carbonate, usually of from five to two per cent. in addition to the hyposulphite—that is, the leaching solution contains the usual amount, one to three per cent. of hyposulphite, and from five to two per cent. of either carbonate of soda, carbonate of potassium, or a carbonate of ammonium. Either one of these carbonates will convert lead, sulphate, or chloride into carbonate of lead, which is insoluble by the hyposulphite solution. On the other hand, the compounds of gold, silver, and copper are dissolved as usual. Consequently under my process the gold and silver and copper compounds pass out of the ore in the hyposulphite solution leaving the lead behind in the ore. The gold, silver, and copper bullion, therefore, contain no lead.

I do not herein claim as my invention the use of a soluble carbonate to revive a hyposulphite leaching solution.

The process covered by this application differs from that set forth and claimed in the application No. 47,530, filed by me December 10, 1881, in that by that process the lead is removed from the ore or metallurgical product along with the precious metals by the solution used, and is afterward precipitated from the solution separate from such metals, while by this process herein set forth and claimed, the precious metals are removed from the ore while the lead is left in it.

Having thus described my invention, what I claim is—

The process of separating from ores and metallurgical products gold, silver, and copper free from lead, which consists in leaching the ore or product with a hyposulphite solution containing a soluble carbonate, substantially as described.

In testimony whereof I affix my signature in presence of two witnesses.

EDWARD HUBBARD RUSSELL.

Witnesses:
F. J. LEWIS,
E. H. BRUCE.